United States Patent [19]

Ladish et al.

[11] 4,136,072

[45] Jan. 23, 1979

[54] THERMOPLASTIC POLYOLEFIN FILM COMPOSITIONS

[75] Inventors: Charles E. Ladish, Beaver; Earl S. Hill, Jr., Coraopolis, both of Pa.

[73] Assignee: Arco Polymers, Inc., Philadelphia, Pa.

[21] Appl. No.: 800,144

[22] Filed: May 24, 1977

[51] Int. Cl.$^2$ ............................................... C08L 93/00
[52] U.S. Cl. .............................. 260/27 R; 260/27 EV
[58] Field of Search .......................... 260/27 R, 27 EV

[56] References Cited

U.S. PATENT DOCUMENTS

| | | | |
|---|---|---|---|
| 2,928,797 | 3/1960 | Brunson et al. | 260/27 R X |
| 3,232,895 | 2/1966 | Klein et al. | 260/27 EV |
| 3,313,754 | 4/1967 | Logan | 260/27 EV |
| 3,615,106 | 10/1971 | Flanagan et al. | 260/27 EV X |
| 3,853,606 | 12/1974 | Parkinson | 260/27 R X |

FOREIGN PATENT DOCUMENTS

| | | | |
|---|---|---|---|
| 645914 | 11/1950 | United Kingdom. | |
| 781467 | 8/1957 | United Kingdom | 260/27 EV |

OTHER PUBLICATIONS

Proceedings of Chem. Spec. Mfgs. Assn.; "Study of Refined Shellac in Admixture with Polymeric Materials"; 1957; pp. 148–158.

*Primary Examiner*—Lewis T. Jacobs
*Attorney, Agent, or Firm*—Hubert E. Evans

[57] ABSTRACT

Improved thermoplastic polyolefin films are provided with the desired improvements in certain properties to make them especially suitable for packaging fresh meat and other foods, as well as for packaging other products, by the use of selected additives to improve or maintain certain desired properties, such as, gloss, antifogging, tensile strength, tear resistance, cling and tack, low blocking (that is low, film to metal coefficient of friction), low water transmission, desired levels of permeability to oxygen and carbon dioxide, heat sealability at lower temperatures but with an adequate range (without burn through), and the like. A preferred composition, comprises a transparent thin polyethylene film with at least one additive and a shellac compound. A particularly preferred composition comprises a copolymer of low density polyethylene and vinyl acetate plus one or more additives, and a shellac material.

8 Claims, No Drawings

THERMOPLASTIC POLYOLEFIN FILM COMPOSITIONS

BACKGROUND OF THE INVENTION

Low density polyethylene film has high usage appeal for a wide range of applications. As an example, it is widely used for shrink wrapping of articles or combinations of articles where the film after being stretched or oriented during manufacture is wrapped about an object and shrinks upon the application of heat, closely conforming to the wrapped article and furnishing protection while having sufficient transparency to provide a view of the article. Other uses include a wrap for bread, confections, baked goods, and other food products, packages for liquids enclosed in a box frame structure, bags for produce, soft goods, i.e., fabrics and the like (replacing kraft paper in many instances), a wrap for frozen food, ice bags, heavy wall bags, drum liners, trash bags, etc.

The appeal of polyethylene for these applications is based on a number of factors. The density of polyethylene has a range from about 0.910 to about 9.970 grams per cubic centimeter. When extruded and produced as a blown film, low density polyethylene (density of about 0.910 to about 0.928) results in a yield of about 42,000 sq. inches per pound for a 0.7 mil thickness film. Using 1 mil. film for comparison purposes, the yield of polyethylene is 30,000 sq. inches per pound and is significantly higher than other similar films. For example, cellulose acetate has an area factor of 21,000 to 22,000 sq. inches per pound per mil, nylon 6 is 24,500, high density polyethylene is 29,000. A copolymer of ethylene and vinyl acetate is 29,000, polystyrene is 26,300, and polyvinylchloride (plasticized) is 20,000 to 23,000. Thus, polyethylene and copolymers of ethylene and vinyl acetate give yields of film on the order of as much as 1½ times the yield of other plastic films.

The tensile strength of polyethylene film without any additives is adequate for most packaging purposes, although lower than that of cellulose acetate, Nylon 6, or polystyrene films, and is comparable to the strength of polyvinylchloride film.

Elongation (In percentage) of uncompounded polyethylene film is much higher than that for cellulose acetate, polystyrene, or Nylon 6, and polyethylene or copolymers of ethylene with vinyl acetate exceed the elongation of polyvinylchloride.

In the case of tear strength, polyethylene and EVA copolymers exceed that of nearly all other thermoplastic films and are suitable for packaging in this regard.

Water Absorption for films of polyethylene and EVA copolymers is very low, as is polyvinylchloride, but is markedly lower than the water absorption for cellulose acetate, Nylon 6, or polystyrene films.

Water vapor transmission for polyethylene film is lower than cellulose acetate, Nylon 6, and polystyrene by a marked degree, and lower than polyvinylchloride. This is an important physical property for a thin packaging material especially in films less than 1 mil in thickness.

Polyethylene and especially EVA copolymers have high permeability to $CO^2$ gases compared with all of the above films and is also high in permeability to oxygen. This property is especially meaningful for thin films when packaging fresh meats and produce.

Even though polyethylene has many desirable properties for packaging purposes, some of its properties can be improved for all or certain packaging applications. For example, polyethylene alone does have a haze and could be improved when greater contact clarity with a product to be packaged is desired. Polyethylene could also have a greater gloss to give it a better appearance. The heat sealing temperature range for low density polyethylene films of about 1 mil and less is a comparatively narrow range and would make a better packaging material if it could be a broader range and preferably a lower temperature. Heat sealability can be improved by increased burn through resistance. For some uses a better hand or softness and more cling and tack are desirable improvements.

Another disadvantage of polyethylene when it is desired to improve its properties for packaging purposes is its property of being inert. Possibly because it is relatively insoluble or non-compatible, it is difficult to add and incorporate additives, such as, plasticizers, into polyethylene, without their bleeding or exuding to the surface, if added, over a relatively low amount. This is true, even if the additives are intimately admixed throughout the polyethylene.

Thus, while polyethylene and its EVA copolymers are desirable for many film uses their use for many applications can be greatly improved by the use of appropriate additives alone or in combination.

SUMMARY

The present invention provides polyolefin thermoplastic film compositions for many purposes especially where high strength, contact clarity, high gloss, elongation, tear resistance, cling, tack, antifogging, permeability to $O_2$ and $CO_2$, and improved heat sealability attributes are desired.

Further, it has been found that certain substances can be added to polyethylene to improve its capacity to retain additives for improving its properties, such as, plasticizers.

A preferred embodiment of the present invention is a copolymer of low density polyethylene and vinyl acetate with one or more additives to plasticize the film and contribute to other desired properties, plus a shellac material, resulting in a film that has increased strength, high cling and tack, high gloss, and a relatively low but adequately broad heat sealability range. Such a film is especially desirable for the packaging of fresh meat and produce.

Films embodying the present invention may be made by intimately blending the polyethylene thermoplastic with the desired additives and then producing film by extrusion and blown film techniques or by casting the film as it is extruded in molten form. These techniques are well known and are not, therefore, fully described herein.

DETAILED DESCRIPTION OF INVENTION

In accordance with the present invention a composition for use in making film comprises:

a. polyolefin base composition b. one or more additives to plasticize and/or improve other properties, and c. shellac material additive.

Among the polyolefins, low density polyethylene seems best suited to produce a film for wrapping needs. One of the problems, however, is that polyethylene is a basically relatively inert composition and it is difficult to incorporate additives that will be retained in the polyethylene without excessive bleeding to the surface.

Rather than a low density polyethylene homopolymer, a copolymer of ethylene and vinyl acetate is generally preferred as the base composition. A preferred example is a copolymer of ethylene and vinyl acetate, the vinyl acetate content being present in about 1 to 15%, the copolymer having a melt index of about 0.6 up to about 10, recognizing that a lower melt index provides greater strength. This copolymer has increased transparency, greater contact clarity, and has improved elasticity which makes it especially suitable for stretch or shrink packaging. However, the EVA copolymer requires the use of other additives, such as plasticizers to give the resultant film a softer hand, or additives to provide a greater tack and cling, higher gloss, greater strength, greater elastic recovery, improved heat sealability and the like. For this reason it is desirable to add a plasticizer which will give the polyethylene film a softer hand yet retain greater contact clarity and transparency, and improvement in the antifogging and the lowering of the film to metal coefficient of friction.

It has also been found that the use of additives, such as, certain elastomers, aid in retaining the plasticizer and other additives in the film once they are intimately admixed so as to control the migration or exudation of the additives to the surface of the film. This type of additive also allow the addition of greater amounts of other additives useful for improving film properties.

Another factor that must be taken into account in the selection of additives involves not sacrificing desirable properties to gain an improvement in another property. That is, the various additives must be selected with relation to one another so that improvements obtained by one additive to a particular property are not adversely diminished or offset by the use of another additive to improve one or more of the properties of the final product.

There are a large number of plasticizers readily available for blending with thermoplastic polyolefins, such as, polyethylene. Plasticizers are desirable to primarily give a better "hand" to the plastic film. "Hand" may be described as a feeling of softness, flexibility and/or smoothness. In addition a plasticizer additive may give the resultant film greater contact clarity and transparency, a low film to metal coefficient of friction, higher tack or cling, and increased strength. A desirable plasticizer for the present invention comprises glycerol monooleate or in combination with other similar products, such as, dioleates. A desirable plasticizer for the present invention comprises a mixture of polypropylene glycol, mono and diesters of fats and fatty acids, mono and diglycerides, lecithin and hydrogenated vegetable oils. This is a composition sold under the trademark EC-25 by Durkee. A combination of two or more plasticizers, such as, glyercol, monooleate and EC-25 is an especially preferable additive to obtain the plasticizing action. Plasticizers or combinations thereof are generally added in an amount of approximately 0.2 to about 12% by weight of the final film. In the case of a thin film useful for meat packaging a preferred range is from approximately 1 to about 4%.

The shellac material is a surprisingly beneficial addition to the film composition. The addition of this material adds significant gloss or sparkle to the film, with no effect on contact clarity. It is also important in increasing the cling and tack of the film. While the true action of the shellac material is not thoroughly understood, it is believed that it has a tendency to act as a cohesive binder for the various components of the film and, therefore, results in a better heat sealability without burn through.

It is desirable to have a broad range of heat sealability for a thin film due to the fact that available commercial heat sealers are generally not equipped with accurate thermostats, and therefore, exposed to a wide range of temperatures. Obviously, it is desirable to use as low a sealing temperature as possible to obtain an adequate seal and yet minimize the time of exposure for heat sealing. Another factor is that if the cling and tack of the film is at an appropriate level, the amount of sealing required to insure a reasonably sturdy package is reduced.

It is also postulated that the use of a shellac material has the effect of increasing the tensile strength possibly due to its action as a binder. Similarly, it may provide a higher resistance to tear or rupture of the film.

It is recognized that shellac is a material, the chemical nature of which is not completely understood. It is a hard brittle resinous solid believed to be of a polyester type of resin probably a mixture of polyesters made of various hydroxy aliphatic and sesqui terpenic acids, such as, aleuritic. For the purposes of the present invention other materials that exhibit the same properties function in the same manner. It is believed that other natural resins, such as, accroides, fossil resins, copals, and the like, may be used. It is understood that certain synthetic resins or combinations of natural and synthetic resins may serve as alternates and provide the same effects. Examples of these are: rosin-maleic acid or rosin fumaric acid adducts, styrene shellac copolymers, styrene manila gum copolymers, and the like.

The amount of shellac material to be added will vary according to the properties of the finished product desired. However, except in the case of very pure materials shellac has a tendency to add color to the final film which, of course, will limit the maximum amount to be used. A desirable range for the shellac additive is about 0.05% to about 1% by weight of the final film. Desirable results have been obtained with the addition of 0.1% shellac material and it is highly preferable to add a shellac in an amount of 0.5%.

A preferred example of a film embodying the present invention comprises a low density polyethylene copolymer with vinylacetate, the vinylacetate being present in an amount of about 12%, a plasticizer additive in an amount of about 3% and an orange shellac in an amount of about 0.5%.

Other additional additives may also be desirable to enhance various properties of the composition. One of these additives is a small percentage of high density polyethylene having a density of about 0.95. It has been found that this additive will effect the heat sealability range of the film so that it is relatively broadened and yet low enough to avoid too great a tendency for burn through. Such a desirable heat sealing range is in the approximate area of 180° to 240° F. to provide an appropriate contact time. High density polyethylene in larger amounts as an additive may have an adverse effect on the high gloss of the film. This is minimized or offset by the shellac material. However, high density polyethylene tends to detract from contact clarity and transparency in proportion to the amount used. Thus the high density polyethylene is a desirable additive in a range of about 0.2% to 12% and preferably about 3 or 4%. The high density polyethylene additive is believed to provide greater tensile strength and high resistance to tear. Low density polyethylene especially in the form of a thin film creates some problems in heat sealing as it seems to have a lower ability to withstand burn through. An EVA copolymer has an improved heat sealability range, and the high density polyethylene additive contributes to improvement in heat seal range capability.

Other desirable additives are elastomers of highly paraffinic hydrocarbon polymers composed of long straight molecules having terminal unsaturation only. For Example, polyisobutylenes are available under the trademark Vistanex, and are sold in grades of varying molecular weight range. When elastomers of this type are added, they contribute to puncture resistance, strength, and improved heat sealing properties. It is believed that this additive when used in a range of about 0.1 to 5.0% can be beneficial to the resultant film and a preferred range is approximately 1 or 2%.

Another example of an elastomer type additive comprises an ethylene — propylene copolymer, sold under the trademark Vistalon.

It has been found that the use of these elastomer additives also has a surprising effect of allowing an increase in the amount of plasticizer additive that may be incoporated and retained in a polyethylene film. While it is hard to normally incorporate amounts much over 2% of plasticizer, the use of elastomer additives alone or in combination can permit the incorporation of up to about 12% plasticizer or more, if such an amount were desired.

In general the composition of the present invention may be made in accordance with known methods, but it is preferable to provide an intimate association and mixing of the ingredients throughout the polyethylene film composition. The composition may be intimately admixed by the use of a batch mixer, such as, a Banbury mixer or may be made in a continuous mixer, such as, a Werner and Pfleiderer.

In the interest of economy it is appropriate to make a mixture having a higher concentration of the additives than desired, thus providing a master batch which can be diluted by additional polyolefin base composition to provide the desired final film composition.

The intimate mixing of the components is an essential part of the present invention. Film made from a base polyolefin composition having the same additives applied to the film in the form of a coating will not provide a film having the properties obtained by the present invention.

Throughout the description of the present invention the use of an ethylene vinylacetate copolymer has been described. However, it is to be understood that intimately blended polymers of ethylene and vinylacetate may be used and will give similar results. It is believed that the copolymerization is preferred for obtaining the most desirable results.

The film is produced by introducing the end composition to an extruder and then extruding a film by the blown film technique, as is well known in the art.

The desired film may also be produced by extrusion and casting of the molten film onto a chill roll where it is molded prior to being wound in sheet form. This process is not presently commercially used as widely as the blown film technique due to the initial capital investment required.

A most preferred formulation involving the present invention comprises an ethylene — vinylacetate copolymer (having approximately 12% vinylacetate content and a melt index of about 0.6) in the amount of about 92.75%, plasticizer in the amount of about 2.75%, a shellac material additive in the amount of 0.5% high density polyethylene (approximately 0.95 density and 6 melt index) in the amount of 2.75% and an elastomer additive in the amount of 1.25%.

We claim:

1. A thermoplastic polyolefin film composition suitable for packaging use comprising a polyolefin containing one or more additives having a plasticizing effect and about 0.05% to about 1.0% of a shellac.

2. A film composition in accordance with claim 1 in which the additives are intimately mixed together with the polyolefin prior to formation of said film.

3. A film composition as claimed in claim 2 in which the polyolefin is a low density polyethylene and which contains from about 0.2% up to about 5% of a high density polyethylene.

4. A transparent thermoplastic polyolefin wrapping film comprising:
   a. a predominant amount of an ethylene copolymer,
   b. one or more plasticizer additives in sufficient quantity to provide the predetermined requisite properties of gloss, anti-fog, contact clarity, tackifier, cling, low resistance to blocking and adequately low film to metal coefficient of friction, and
   c. a shellac in sufficient quantity to impart desired prerequisite properties of tack, gloss, strength, cohesiveness, and improved heat sealability.

5. A film composition suitable for making film for use in wrapping fresh meat and other food products comprising:
   a. a copolymer of ethylene and vinyl acetate,
   b. at least one plasticizer additive in an amount of about 0.2 to 12% by weight intimately associated with and dispersed throughout said film to enhance properties of flexibility, anti-fog, contact clarity, tack, and
   c. a shellac in an amount of about 0.05 to about 1.0% intimately associated with and dispersed throughout said film to lower and broaden the heat sealing temperature range, to enhance the properties of gloss and to increase tack and cling of said film.

6. A film composition suitable for use in making thin films of less than 1 mil comprising:
   a. a transparent thermoplastic ethylene copolymer,
   b. from about 0.2 to about 12% of one or more plasticizing additives,
   c. from about 0.05 to about 1% of a shellac
   d. from about 0.1 to about 5% of an elastomer, said components being intimately mixed and fabricated into a thin film form.

7. A composition as claimed in claim 6 which contains from about 0.2% up to about 5% of high density polyethylene.

8. A thin film composition suitable for wrapping meat and other fresh food products comprising:
   a. a copolymer of low density polyethylene and vinyl acetate in an amount equal to about 92.75% by weight,
   b. one or more plasticizers in an amount of about 2.75% by weight,
   c. a shellac in an amount of about 0.5% by weight,
   d. a high density polyethylene in an amount of about 2.75% by weight, and
   e. an elastomer in an amount of about 1.25% by weight, all of said ingredients being intimately mixed together and fabricated into a thin film.

* * * * *